United States Patent [19]
Riera

[11] Patent Number: 6,103,011
[45] Date of Patent: Aug. 15, 2000

[54] BRUSH APPLICATOR

[75] Inventor: Frank J. Riera, Troy, Mich.

[73] Assignee: T. L. International, Inc., Madison Heights, Mich.

[21] Appl. No.: 09/082,277

[22] Filed: May 20, 1998

[51] Int. Cl.[7] .............................. B05C 11/00; B05D 5/00; B05D 1/28; B67D 3/00; A46B 11/00
[52] U.S. Cl. .................... 118/264; 118/266; 427/256; 427/284; 427/287; 427/429; 222/187; 401/129
[58] Field of Search ....................... 118/264, 266; 427/260, 256, 284, 287, 429; 222/187; 205/117; 401/129

[56]  References Cited

U.S. PATENT DOCUMENTS

| | | | |
|---|---|---|---|
| 697,374 | 4/1902 | Stuart et al. | 118/220 |
| 1,572,205 | 2/1926 | Harding | 118/239 |
| 4,605,569 | 8/1986 | Shimada et al. | 427/256 |
| 5,070,344 | 12/1991 | Gascuel et al. | 346/1.1 |
| 5,083,525 | 1/1992 | Riera | 118/106 |
| 5,277,927 | 1/1994 | Burns et al. | 427/8 |
| 5,456,753 | 10/1995 | Kuribayashi et al. | 118/244 |

*Primary Examiner*—Richard Crispino
*Assistant Examiner*—J. A. Lorengo
*Attorney, Agent, or Firm*—Harness, Dickey & Pierce, P.L.C.

[57]  ABSTRACT

A system for applying adhesive to the peripheral edge of a window glass includes a brush which is held stationary while the window glass is moved with respect to the brush to apply the adhesive. The brush includes a plastic sleeve which exposes only a specified portion of the bristles of the brush. After the bristles have worn, the brush is moved to a cutting station where a portion of the sleeve is removed to expose another portion of the bristles. This operation continues until there is no material left on the sleeve to trim. At this point, the brush is discarded and replaced with a new brush automatically. Rather than have the window glass move with respect to the brush, the brush can be moved with respect to the window glass if desired.

16 Claims, 3 Drawing Sheets

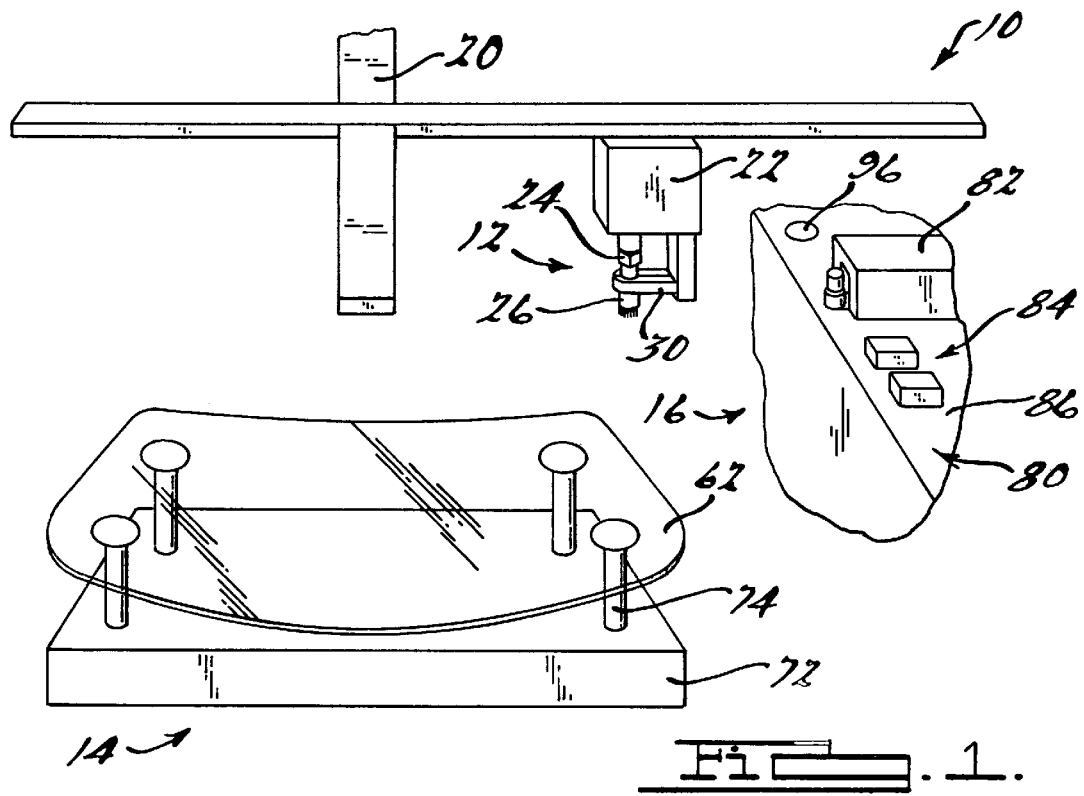
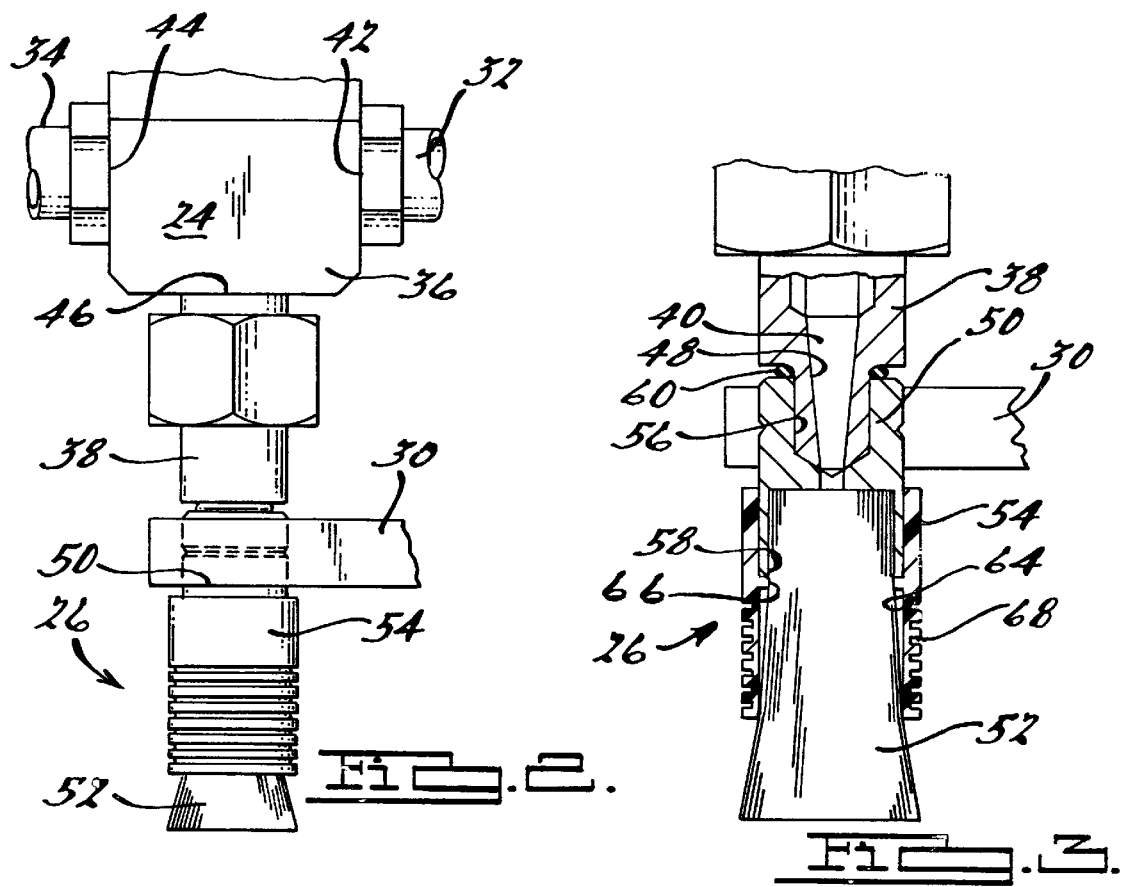

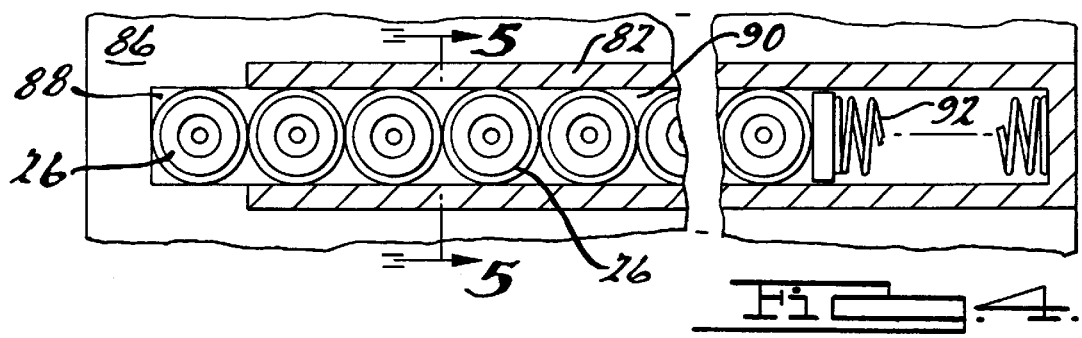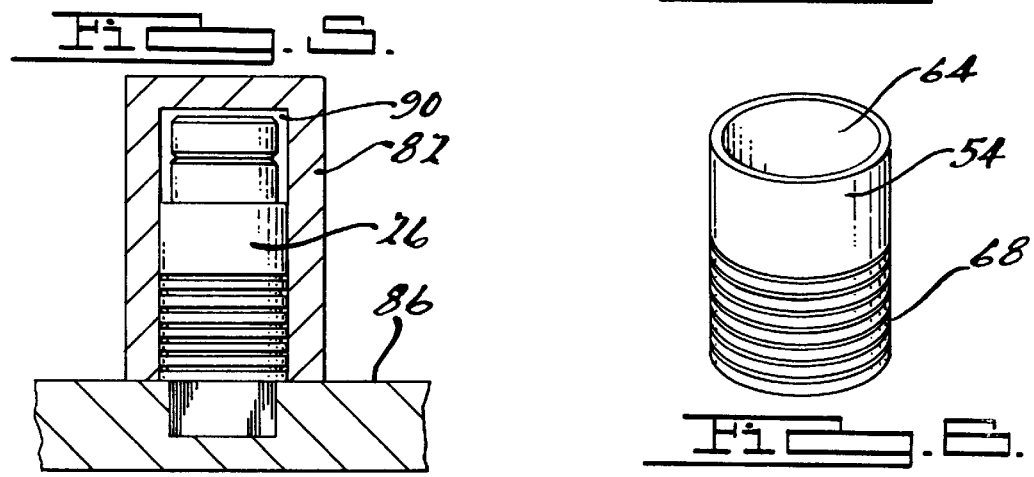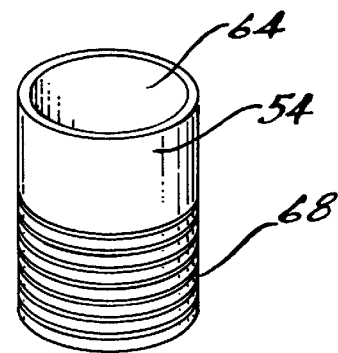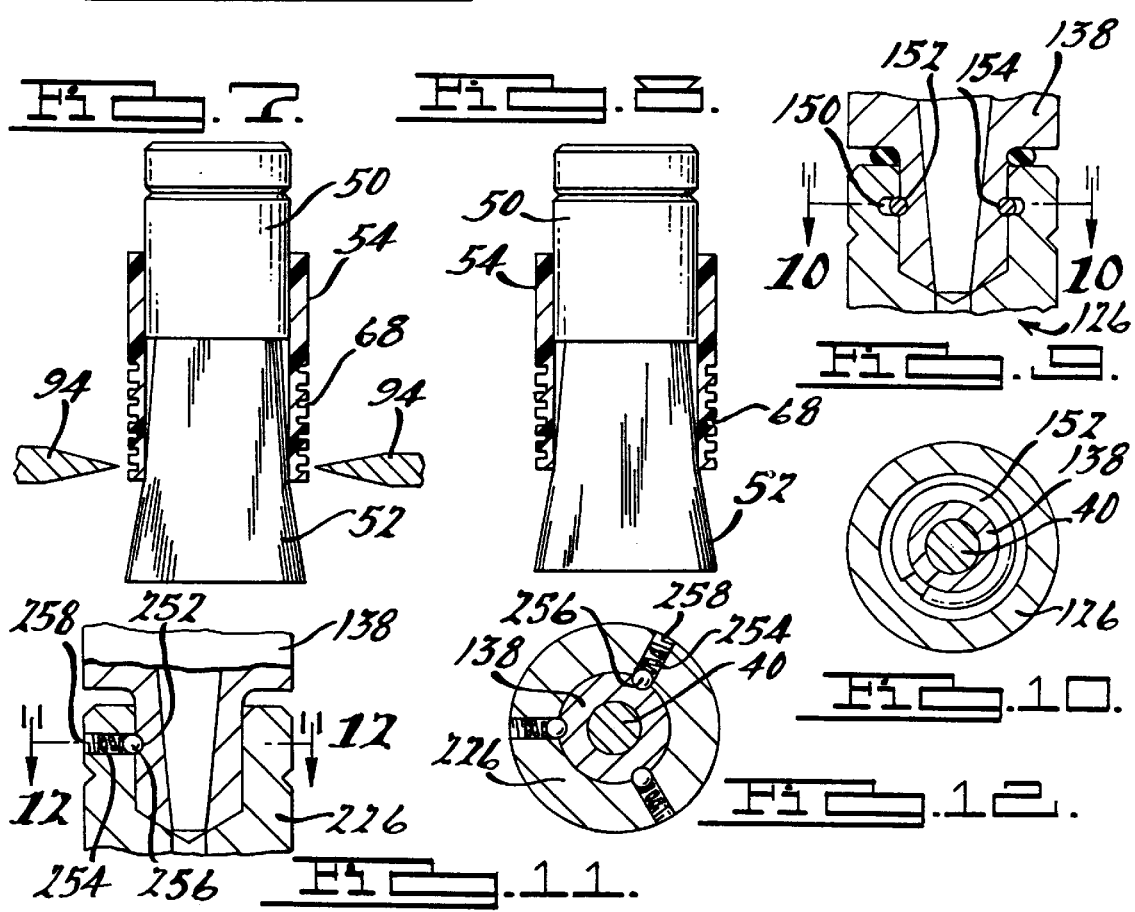

BRUSH APPLICATOR

FIELD OF THE INVENTION

The present application relates generally to a dispensing apparatus for dispensing a coating such as a primer or an adhesive onto a motor vehicle window glass. More particularly, the present invention relates to an automated dispensing apparatus which brushes a coating onto a motor vehicle window glass prior to installation of the window glass into the motor vehicle.

BACKGROUND AND SUMMARY OF THE INVENTION

Window glass installed in present day motor vehicles typically incorporates a blacked out band extending around the peripheral edge portion of the glass to which adhesives are applied to secure the window glass to the vehicle. In order to prepare the glass for the adhesive, it is necessary to apply a clear coat to etch and clean the glass. Next, an initial primer coating is applied to the window glass. After the primer coating is allowed to dry, an adhesive is applied to the outer circumferential portion of the glass which is then installed in the vehicle. In some vehicle designs, the blacked out band is eliminated and the adhesive is applied directly to the outer circumferential portion of the glass itself.

The process for applying the various coatings and in particular the primer to the glass utilizes a supply of the specific coating that is dispensed through a nozzle to the central core of a brush. The brush is typically attached to the nozzle using a threaded connection or some other type of connecting system known in the art. The nozzle and brush assembly are moved around the outer circumference of the glass by an articulated robot arm while the coating is being dispensed into the brush by the nozzle. In the alternative, the glass can be moved with respect to the brush rather than the brush with respect to the glass. Once the application of the coating has been completed, the glass is assembled to the motor vehicle.

These prior art nozzle/brush systems have performed satisfactory but there are certain areas which can be improved upon. One area which provides some problems for the manufacturer is the durability of the brush which is attached to the nozzle. During the application of the coating, the bristles of the brush sweep against the glass to provide a consistent application of the coating. As the bristles sweep across the glass, they begin to wear down and eventually have to be replaced. In order to apply a proper amount and a proper distribution of the coating, the free length of the bristles needs to be maintained within a specified tolerance. If the free end of the bristles are too long, the width of the coating will become excessive. If the free end of the bristles are too short, the width of the coating will be too small. Typically, a brush will last from one to two hours of production after which the free end of the bristles become too short and the machine must be stopped in order to replace the brush on the nozzle. The threaded connection between the brush and the nozzle facilitate this changeover. The need to stop the machine in order to replace the brush produces downtime which adversely effects the productivity of the assembly process. Thus, it would be advantageous to develop a system which minimizes or eliminates the downtime associated with the replacement of the brushes for this coating application system.

The present invention provides the art with a system that essentially eliminates the downtime associated with replacement of the brushes for a coating application system. The brush replacement system of the present invention provides a two stage system for renewing the brush which is attached to the nozzle. The first stage of the system utilizes a brush which has an extended length of bristles. A plastic sleeve surrounds the bristles and the housing supporting the bristles. After a specified period has elapsed, the assembly machine cycles to a station where a portion of the plastic sleeve adjacent the bristles is trimmed away to expose an additional portion of the extended length of bristle. This process continues until all of the plastic sleeve surrounding the bristles has been removed. Once all of the plastic sleeve has been removed, the brush replacement system enters the second stage. In the second stage, the assembly machine cycles to automatically discard the used brush and automatically obtain a new brush from a magazine or supply of new brushes disposed adjacent to the machine. The application of the coating continues with the new brush and the process begins again. The machine utilizes a quick connect system between the nozzle and the brush to facilitate the automatic replacement of the brush. Typically the trimming of the plastic sleeve and/or the replacement of the brush can be accomplished during the normal cycle time for the assembly process thus eliminating the brush replacement related down time.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is a perspective view schematically illustrating a coating application system utilizing a nozzle/brush system in accordance with the present invention;

FIG. 2 is an enlarged side view illustrating the nozzle and brush head shown in FIG. 1;

FIG. 3 is a cross-sectional side view of the nozzle and brush head shown in FIGS. 1 and 2;

FIG. 4 is a plan view, partially in cross-section, of the magazine shown in FIG. 1 which maintains the supply of brushes for the coating application system;

FIG. 5 is a cross-sectional view taken in the direction of arrows 5—5 shown in FIG. 4;

FIG. 6 is a perspective view of the plastic sleeve associated with each of the brushes;

FIG. 7 is a cross-sectional side view prior to the trimming of the plastic sleeve;

FIG. 8 is a cross-sectional side view after the trimming of the plastic sleeve;

FIG. 9 is a cross-sectional side view illustrating a quick connect system between the brush and the nozzle;

FIG. 10 is a cross-sectional view in the direction of arrows 10—10 shown in FIG. 9;

FIG. 11 is a cross-sectional side view illustrating a quick connect system between the brush and the nozzle in accordance with another embodiment of the present invention; and FIG. 12 is a cross-sectional view in the direction of arrows 12—12 shown in FIG. 11;

DETAILED DESCRIPTION OF THE PREFERRED EMBODIMENT

Figure 13:
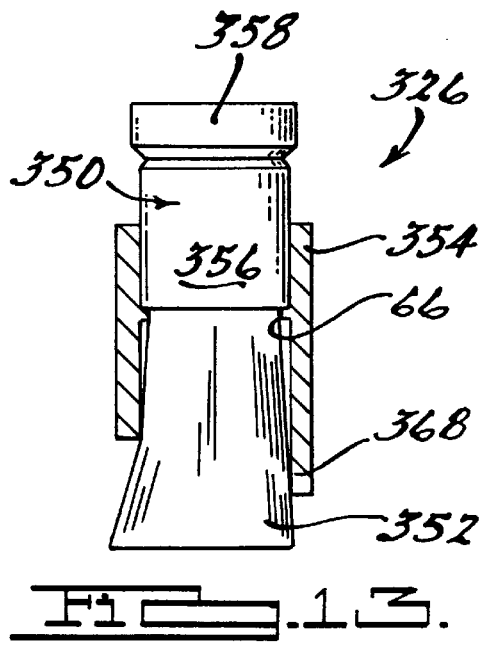
FIG. 13 is a cross-sectional view of a brush in accordance with another embodiment of the present invention.

Referring now to the drawings in which like reference numerals designate like or corresponding parts throughout the several views, there is shown in FIG. 1 a coating application system in accordance with the present invention which is designated generally by the reference numeral 10. Coating application system 10 comprises a coating application assembly 12, a windshield positioning assembly 14 and a brush supply system 16. Coating application system 12 includes a support rail 20, a coating supply carriage 22, a coating supply nozzle 24 and a coating brush 26. Support rail 20 is secured above windshield assembly 14 and provides a rail or track to allow for and guide the movement of carriage 22. As shown FIG. 1, support rail 20 allows for two axis movement of carriage 22 along rail 20.

Coating carriage 22 is adapted for movement along support rail 20 in order to position both nozzle 24 and brush 26 in the proper position with respect to windshield positioning assembly 14. Coating carriage 22 includes a clamp 30 which secures brush 26 to nozzle 24 as described in detail later herein.

Referring now to FIGS. 2 and 3, coating nozzle 24 is attached to carriage 22 and is connected to a supply of the coating (not shown) using an inlet hose 32 and an outlet hose 34 (FIG. 2). Inlet hose 32 and outlet hose 34 maintain a continuous circulation of the coating material to eliminate any clogging of nozzle 24 between cycles of system 10. Nozzle 24 comprises a housing 36, a nozzle head 38 and a tapered pin 40. Housing 36 defines an inlet 42 for connection with hose 32, an outlet 44 for connection with hose 34, and an outlet 46 which is adapted to threadingly receive nozzle head 38 and to supply the coating material to brush 26. Nozzle head 38 is threadingly received by outlet 46 of housing 36 and head 38 defines a tapered bore 48 within which tapered pin 40 is located. Tapered pin 40 is disposed within bore 48 and is designed to move axially with respect to housing 36 to open and close outlet 46, by opening and closing bore 48, respectively. The axial movement of tapered pin 40 may be controlled by air pressure or it may be controlled by an electric solenoid. In the present invention, housing 36 is connected to a source of pressurized air (not shown) which controls the movement of tapered pin 40 within housing 36. Thus, when tapered pin 40 is moved upward within head 38, the coating flows from hose 32 through inlet 42, through outlet 46 and through bore 48 to reach brush 26. When tapered pin 40 is moved downward within head 38, bore 48 is plugged and the coating flows from hose 32 into inlet 42 through outlet 44 and hose 34 back to the supply of the coating.

Brush 26 comprises a housing 50, a plurality of bristles 52 and a sleeve 54. Housing 50 is a generally cylindrical, preferably aluminum, housing which defines a bore 56 which mates with nozzle head 38 and a bore 58 within which are secured the plurality of bristles 52. Bore 56 is connected to bore 58 to allow the coating to flow from bore 48 of nozzle head 38 through bore 56 and into bore 58 of brush 26. In this way, the coating is supplied to the central internal region of bristles 52. An O-ring seal 60 seals the interface between housing 50 and nozzle head 38. Bristles 52 are secured within bore 58 by means known in the art and extend from housing 50 in order to evenly spread the coating on a windshield or window glass 62 (FIG. 1). Sleeve 54 is preferably a plastic sleeve which defines an interior bore 64 which is slidingly received over housing 50. Interior bore 64 is stepped to define a rib 66 which rests against the end of housing 50 to position sleeve 54 with respect to housing 50. Rib 66 positions sleeve 54 with respect to housing 50 and bristles 52 such that the proper free length of bristles 52 extend below the lower end of sleeve 54. The exterior surface of sleeve 54 defines a plurality of annular grooves 68 which provide for the adjustment of the free length of bristles 52 which extend below sleeve 54 as will be described later herein.

Referring back to FIG. 1, windshield positioning system 14 comprises a movable table 72 and a supporting structure 74. Windshield 62 is supported by supporting structure 74 at a predetermined position with respect to coating application assembly 12. Table 72 is a movable table capable of being moved in six directions with respect to assembly 12 by methods known well in the art. Once windshield 62 is positioned on supporting structure 74, table 72 moves with respect to assembly 12 such that brush 26 is swept along the outer circumferential surface or the peripheral edge of windshield 62 while the coating is being supplied to brush 26 through nozzle 24.

Referring now to FIG. 1, 4 and 5, brush supply system 16 comprises a supporting structure 80, a magazine 82 and a trimming station 84. Supporting structure 80 is fixedly secured with respect to coating application assembly 12. Structure 80 defines an upper table 86 which defines a slot 88 within which a plurality of brushes 26 are positioned. Magazine 82 is a box-like structure which is positioned over slot 88 and includes an interior chamber 90 which is sized to slidingly receive a plurality of brushes 26. A spring 92 urges the plurality of brushes 26 out of magazine 82 towards assembly 12. Trimming station 84 is also located on table 86. Trimming station 84 includes cutters 94 (FIG. 7) which trim the lower portion of sleeve 54 as will be described later herein. Table 86 also defines an aperture 96 which is designed to accept used brushes 26 and direct them to the appropriate disposal system.

The operation of coating application system 10 begins with the system as shown in FIG. 1. Windshield 62 is positioned on supporting structure 74 on table 72 of windshield positioning system 14 and coating application assembly 12 is positioned above windshield 62 with carriage 22 positioned in the predetermined position to locate brush 26 at its predetermined position. Table 72 is activated and windshield 62 is moved with respect to brush 26 such that brush 26 sweeps along the outer circumferential edge of windshield 62. While windshield 62 is being moved with respect to brush 26, air pressure is supplied to housing 36 to move tapered pin 40 upward opening bore 48 allowing the coating to flow into bristles 52 of brush 26 such that a uniform layer of the coating is applied to the outer circumferential edge of windshield 62. After sweeping the entire circumference of windshield 62, table 72 returns to its home position. The windshield is removed from supporting structure 74, a new windshield is positioned on supporting structure 74 and the process begins again.

The above process continues until it is decided that brush 26 needs to be renewed due to the wearing or abrading of bristles 52. This decision to renew brush 26 can be made by counting the number of cycles for brush 26, monitoring the condition of the free length of bristles 52 of brush 26, monitoring the quality of the layer of the coating being applied or by any other method which would be indicative of the free length or the condition of bristles 52. Once the need to renew brush 26 is made, carriage 22 moves along rail 20 to a position above table 86. Clamp 30 releases brush 26 from nozzle head 38 of nozzle 24 and positions brush 26 within cutter 34. Cutters 94 of cutter 84 remove the lower ring defined by grooves 68 of sleeve 54 as shown in FIG. 7 to expose an additional portion of bristles 52 as shown in FIG. 8. This renews the proper free length of bristles 52 which extend below the lower end of sleeve 54. Clamp 30 then returns brush 26 to nozzle head 38 of nozzle 24 with housing 50 again compressing O-ring 60 to seal the interface. This entire trimming operation can be performed during the time required for unloading and loading windshield 62. The trimmed size of brush 26 is relayed to the control system for table 72 which then makes the appropriate adjustment to ensure proper engagement between windshield 62 and brush 26.

The above operation continues until the last ring on sleeve 54 has been removed by cutters 94 cutting through the last groove 68. When the last groove 68 is cut, system 10 recognizes that brush 26 can no longer be renewed, it must be replaced. When it is then decided to replace brush 26, carriage 26 moves along rail 20 to a position above table 86. Clamp 30 releases brush 26 from nozzle head 38 of nozzle 24 and positions brush 26 above aperture 96. Clamp 30 releases brush 26 and it falls through aperture 96 to be discarded. Carriage 22 and clamp 30 then move to a position above magazine 82 where it picks up the end brush 26 extending out of magazine 82. Clamp 30 then returns the new brush 26 to nozzle head 38 of nozzle 24 with the new housing 50 again compressing O-ring 60 to seal the interface. This entire operation can be performed during the time required for unloading and loading windshield 62. The fact that a new brush 26 has been positioned on nozzle 24 is relayed to the control system for table 72 which then makes the appropriate adjustment to ensure proper engagement between windshield 62 and brush 26.

Thus, it can be seen that coating application system 10 can run continuously with the only requirement being the maintaining of an adequate supply of the coating and an adequate supply of brushes 26 in magazine 82. The above system significantly increases the productivity of coating application system 10 by eliminating the need to manually replace brushes 26. In addition, the costs associated with brushes 26 is also significantly reduced due to the fact that each brush 26 is renewed a specified number of times prior to being discarded. The prior art brushes were simply discarded after each use because they lack the ability to be renewed.

Referring now to FIGS. 9 and 10, another embodiment of the present invention is illustrated. FIGS. 9 and 10 illustrate a brush 126 which is assembled to a nozzle head 138. Nozzle head 138 is identical to nozzle head 38 with the exception that nozzle head 138 includes a snap ring groove 150. Brush 126 is identical to brush 26 with the exception that brush 126 includes a snap ring groove 152. System 10, shown in FIGS. 1–8, includes clamp 30 which locates and holds brush 26 onto nozzle head 38. Brush 126 is held assembled to nozzle head 138 by locating a snap ring 154 within grooves 150 and 152. Snap ring 154 normally sits within groove 152 of brush 126. When clamp 130 engages brush 126 with nozzle head 138, snap ring 154 expands or opens up into groove 152 due to its contact with the tapered end of nozzle head 138. Snap ring 154 slides along the outer surface of nozzle 138 until it aligns with groove 150. Once aligned with groove 150, snap ring 154 snaps into groove 150 to retain brush 126 onto nozzle end 138. In this manner, clamp 30 may be moved away from brush 126 during the application of the coating. The removal of repositioning of clamp 30 may be needed to provide clearance on some applications. When clamp 30 removes brush 126, snap ring 154 is again expanded into groove 152 due to its contact with a ramped surface at the bottom of groove 150.

Referring now to FIGS. 11 and 12, another embodiment of the present invention is illustrated. FIGS. 11 and 12 illustrate a brush 226 which is assembled to nozzle head 138. Brush 226 is similar to brush 126 except that snap ring groove 152 and snap ring 154 have been replaced by a plurality of bores 252, a plurality of springs 254 and a plurality of balls 256. A stop 258 secures springs 254 and balls 256 within bores 252. Balls 256 are biased towards the inside by springs 254. The interior end of bores 252 are slightly smaller than balls 256 thus allowing balls 256 to extend into bore 56 but balls 256 are retained within bores 252. Brush 226 is held assembled nozzle head 138 by having balls 256 being biased into groove 150 by springs 254. Balls 256 normally sit within bores 252 extending into bore 56. When clamp 130 engages brush 226 with nozzle head 138, the plurality of balls 256 are forced further into bores 252 due to their contact with the tapered end of nozzle head 138. Balls 256 slide along the outer surface of nozzle 138 until they align with groove 150. Once aligned with groove 150, balls 256 snap with groove 150 to retain brush 226 into nozzle end 138. In this manner, clamp 30 may be moved away from brush 226 during the application of the coating. The removal of repositioning of clamp 30 may be needed to provide clearance on some applications. When clamp 30 removes brush 226, balls 256 are again forced into bores 252 due to their contact with a ramped surface at the bottom of groove 150.

While the above embodiments have been described as having windshield 62 located on table 72 which moves with respect to brush 26, it is within the scope of the present invention to utilize a stationary table 72 and to have brush 26 move with respect to the stationary table 72. This movement of brush 26 can be performed by an articulated robotic arm or by other means known well in the art. It should be noted that brush 26 need not utilize sleeve 54. Brush 26 can be used by itself along with the brush supply system 16 of the present invention. While the arrangement may not offer the extended use of each brush offered when sleeve 54 is utilized, it still enables substantial cost reductions in facilitating the rapid replacement of worn out brushes. Further, the quick replacement concept of the present invention may also be utilized in situations where the coating is applied by hand rather than automated apparatuses. In such applications, the sleeve, if utilized, may be easily trimmed by hand.

Figure 14:
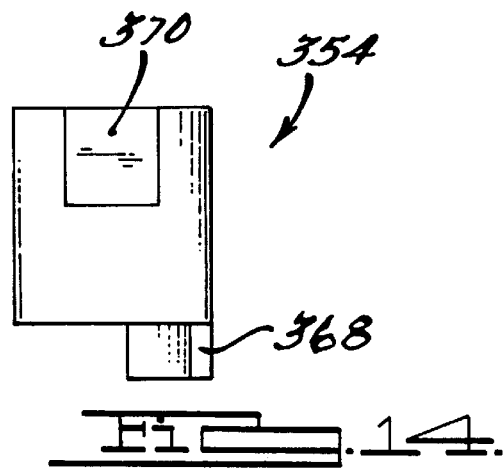
FIG. 14 is a side view of the plastic sleeve shown in FIG. 13.
Figure 15:
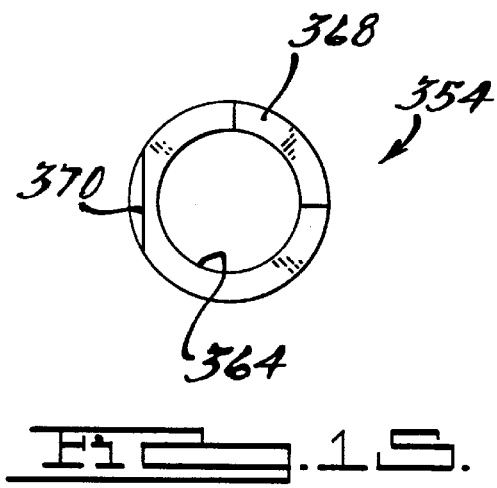
FIG. 15 is an end view of the plastic sleeve shown in FIG. 13 and 14.

Referring now to FIGS. 13–15, a brush 326 is disclosed. Brush 326 comprises a housing 350, a plurality of bristles 352 and a sleeve 354. Housing 350 is generally cylindrical, preferably aluminum, housing which defines bore 56 which within which are secured the plurality of bristles 352. Similar to brush 26. D-ring seal 60 seals the interface between housing 350 and nozzle 38. Bristles 352 are secured within bore 58 by means known well in the art and extend from housing 350 in order to evenly spread the coating on a windshield or window glass. Housing 350 includes a lower portion 346 within which bristles 352 are secured and an upper portion 358. Upper portion 358 is larger in outside diameter than lower portion 365 and a design to cooperate with clamp 30 to retain brush 326 within clamp 30. Clamp 30 is designed to grab brush 326 on lower portion 356 between upper portion 358 and sleeve 354.

Sleeve 354 is preferably a plastic sleeve which defines an internal bore 364 which is slidingly received over lower portion 356 of housing 350. Interior bore 364 is stepped to define rib 66 which rests against the end of housing 350 to position sleeve 354 with respect to housing 50. Rib 66 positions sleeve 354 with respect to housing 350 and bristles such that the proper free length of bristles 352 extend below the end of sleeve 354. The lower end of sleeve 354 defines an arcuate shaped extension 368 which provides for the support of bristles 352 when applying the adhesive. It has been found that by including extension 368, a significant improvement in the coating application can be obtained. A flat 370 is provided in the exterior surface of sleeve 354 to control the feeding and orientation of sleeve 354 as it is being fed through magazine 82 as well as when it is assembled to nozzle 24.

Figure 16:
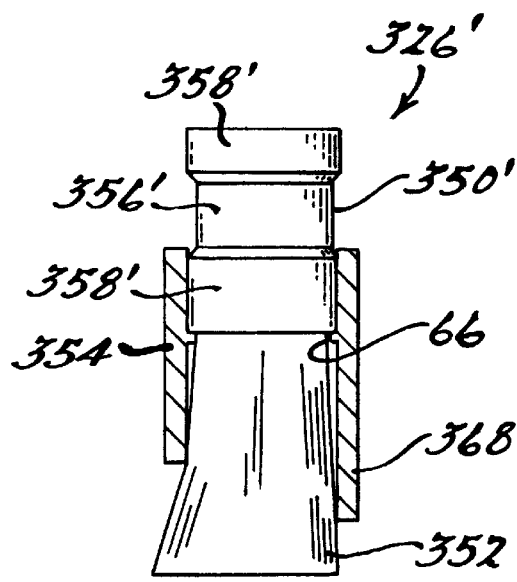
FIG. 16 is a cross-sectional view similar to FIG. 13 but showing a brush in accordance with another embodiment of the present invention.

Referring now to FIG. 16, a brush 326' is disclosed. Brush 326+ is the same as brush 326 except that a housing 350+ includes a pair of enlarged diameter portions 358' and a reduced diameter portion 356'. Enlarged diameter portions 358+ are disposed at opposite ends of housing 350' and reduced diameter portion 356' is located between the two enlarged diameter portions 356'. Clamp 30 is designed to grab brush 326' on reduced diameter portion 356'. Enlarged diameter portions 358' cooperate with clamp 30 to position and retain brush 326' within clamp 30.

While the above detailed description describes the preferred embodiment of the present invention, it should be understood that the present invention is susceptible to modification, variation and alteration without deviating from the scope and fair meaning of the subjoined claims.

What is claimed is:

1. An apparatus for applying material to a window glass, said apparatus comprising:
   a brush comprising a housing, a plurality of bristles secured to said housing and a sleeve supported by said housing, said bristles being disposed within said sleeve;
   means for supporting said brush;
   a supporting structure for said window glass, said supporting structure positioning said window glass at a specified location with respect to said brush;
   means for moving one of said means for supporting said brush and said supporting structure with respect to the other of said means for supporting said brush and said supporting structure; and
   a brush supply system disposed adjacent to said supporting structure, said brush supply system including a plurality of replacement brushes, said means for supporting said brush being operable to discard said brush and replace said brush with one of said replacement brushed of said brush supply system.

2. The apparatus according to claim 1 wherein said means for supporting said brush comprises a supporting rail and a carriage movably connected to said support rail, said brush being attached to said carriage.

3. The apparatus according to claim I wherein said supporting structure comprises a movable table.

4. The apparatus according to claim 1 wherein said brush supply system comprises a cutting station, said cutting station being operable to trim said brush.

5. The apparatus according to claim 1 wherein said brush supply system comprises a cutting station, said cutting station being operable to trim one end of said sleeve to expose a portion of said bristles.

6. The apparatus according to claim 1 wherein said housing defines a plurality of grooves and said brush supply system comprises a cutting station, said cutting station being operable to cut said housing at one of said plurality of grooves.

7. The apparatus according to claim 1 wherein said sleeve defines an arcuate extension to support said bristles.

8. The apparatus according to claim 1 wherein said means for supporting said brush includes a nozzle and a clamp, said clamp being operable to secure said brush to said nozzle.

9. The apparatus according to claim 1 wherein said means for supporting said brush includes a nozzle having a retaining groove and said brush includes a snap ring disposed within a snap ring groove, said snap ring engaging said retaining groove to secure said brush to said nozzle.

10. The apparatus according to claim 1 wherein said means for supporting said brush includes a nozzle having a retaining groove and said brush defines a bore within which is disposed a spring and a ball, said ball being urged into said retaining groove by said spring to secure said brush to said nozzle.

11. The apparatus according to claim 1 wherein said brush supply system includes a magazine for holding said plurality of replacement brushes.

12. The apparatus according to claim 11 wherein said magazine includes a spring for biasing said plurality of replacement brushes in a specified direction.

13. An apparatus for applying material to a window glass, said apparatus comprising:
   a brush;
   means for supporting said brush, said means for supporting said brush including a nozzle having a retaining groove and said brush includes a snap ring disposed within a snap ring groove, said snap ring engaging said retaining groove to secure said brush to said nozzle;
   a supporting structure for said window glass, said supporting structure positioning said window glass at a specified location with respect to said brush;
   means for moving one of said means for supporting said brush and said supporting structure with respect to the other of said means for supporting said brush and said supporting structure; and
   a brush supply system disposed adjacent to said supporting structure, said brush supply system including a plurality of replacement brushes, said means for supporting said brush being operable to discard said brush and replace said brush with one of said replacement brushed of said brush supply system.

14. An apparatus for applying material to a window glass, said apparatus comprising:
   a brush;
   means for supporting said brush, said means for supporting said brush including a nozzle having a retaining groove and said brush defines a bore within which is disposed a spring and a ball, said ball urged into said retaining groove by said spring to secure said brush to said nozzle;
   a supporting structure for said window glass, said supporting structure positioning said window glass at a specified location with respect to said brush;
   means for moving one of said means for supporting said brush and said supporting structure with respect to the other of said means for supporting said brush and said supporting structure; and
   a brush supply system disposed adjacent to said supporting structure, said brush supply system including a plurality of replacement brushes, said means for supporting said brush being operable to discard said brush and replace said brush with one of said replacement brushed of said brush supply system.

15. An apparatus for applying material to a window glass, said apparatus comprising:

a brush;

means for supporting said brush;

a supporting structure for said window glass, said supporting structure positioning said window glass at a specified location with respect to said brush;

means for moving one of said means for supporting said brush and said supporting structure with respect to the other of said means for supporting said brush and said supporting structure; and a brush supply system disposed adjacent to said supporting structure, said brush supply system including a magazine for holding a plurality of replacement brushes, said means for supporting said brush being operable to discard said brush and replace said brush with one of said replacement brushed of said brush supply system.

16. An apparatus for applying material to a window glass, said apparatus comprising:

a brush comprising a housing having a bore and a plurality of bristles secured to said housing, said material being supplied to said bristles through said bore in said housing;

means for supporting said brush;

a supporting structure for said window glass, said supporting structure positioning said window glass at a specified location with respect to said brush;

means for moving one of said means for supporting said brush and said supporting structure with respect to the other of said means for supporting said brush and said supporting structure; and a brush supply system disposed adjacent to said supporting structure, said brush supply system including a plurality of replacement brushes, said means for supporting said brush being operable to discard said brush and replace said brush with one of said replacement brushed of said brush supply system.

* * * * *

UNITED STATES PATENT AND TRADEMARK OFFICE
CERTIFICATE OF CORRECTION

PATENT NO. : 6,103,011
DATED : August 15, 2000
INVENTOR(S) : Frank J. Riera

It is certified that error appears in the above-identified patent and that said Letters Patent is hereby corrected as shown below:

Column 1, line 19, "dear" should be --clear--.

Column 2, line 66, "FIG." should be --FIGS.--.

Column 4, line 25, "FIG." should be --FIGS.--.

Column 5, line 22, "26" should be --22--.

Column 6, line 16, after "assembled" insert --to--.

Column 6, line 53, "56" should be --58--.

Column 6, line 54, delete ".".

Column 6, line 55, "Similar" should be --similar--.

Column 6, line 60, "346" should be --356--.

Column 6, line 62, "365" should be --356--.

Column 6, line 62, "a design" should be --is designed--.

Column 7, line 15, "326+" should be --326'--.

Column 7, line 15, "350+" should be --350'--.

Column 7, line 18, "358+" should be --358'--.

Column 7, line 49, claim 1, "brushed" should be --brushes--.

UNITED STATES PATENT AND TRADEMARK OFFICE
CERTIFICATE OF CORRECTION

PATENT NO. : 6,103,011
DATED : August 15, 2000
INVENTOR(S) : Frank J. Riera

It is certified that error appears in the above-identified patent and that said Letters Patent is hereby corrected as shown below:

Column 8, line 44, claim 13, "brushed" should be --brushes--.

Column 8, line 67, claim 14, "brushed" should be --brushes--.

Column 9, line 18, claim 15, "brushed" should be --brushes--.

Column 10, line 19, claim 16, "brushed" should be --brushes--.

Signed and Sealed this

Seventeenth Day of April, 2001

Attest:

NICHOLAS P. GODICI

Attesting Officer     Acting Director of the United States Patent and Trademark Office